United States Patent [19]

Mecca

[11] Patent Number: 4,880,186

[45] Date of Patent: Nov. 14, 1989

[54] PREFABRICATED SPACE STATION

[76] Inventor: John Mecca, 110 Whittier Dr., San Remo, N.Y. 11754

[21] Appl. No.: 109,726

[22] Filed: Dec. 24, 1986

Related U.S. Application Data

[63] Continuation-in-part of Ser. No. 804,288, Dec. 5, 1985, abandoned.

[51] Int. Cl.$^4$ ............................................. B64G 1/10
[52] U.S. Cl. .................................. 244/159; 244/158 R
[58] Field of Search ............. 244/158 R, 159; 52/2 E; 220/426

[56] References Cited

U.S. PATENT DOCUMENTS

| | | | |
|---|---|---|---|
| 3,144,219 | 8/1964 | Schnitzer | 244/159 |
| 3,169,379 | 2/1965 | Black | 220/426 |
| 3,282,533 | 11/1966 | Spain | 52/2 E |
| 3,357,142 | 12/1967 | Furrer et al. | 52/2 E |

OTHER PUBLICATIONS

"Small Space Stations Built Around Last-Stage Tankage", Kurt R. Stehling, Space/Aeronautics, pp. 45–47, Sep. 1960.

*Primary Examiner*—Sherman D. Basinger
*Assistant Examiner*—Rodney Corl

[57] ABSTRACT

The improvements of the organization and operation has to do with an adhesive that temporarily bonds the internal surfaces of two flexible envelopes equidistantly spaced from each other over the entire surfaces facing each other, the space between the walls bonded together separates upon pressurization of a foam between the walls dispersed by a hollow perforated hoop tube to disperse the foam under pressure evenly, while acting as an anchor of the flexible double wall to the deployment cylinder interior and gas and plastic catalysts reservoir within the container, on the end of the container are flanges as standards for interconnecting modules, hatches, and space craft; multiple function of deployment container offering perimeter as protective shield.

3 Claims, 3 Drawing Sheets

PREFABRICATED SPACE STATION

This application is a continuation in part of Ser. No. 804,288 filed 12/5/85, now abandoned.

BACKGROUND OF THE INVENTION

1. Field of the present invention relates to the use of specialized end terminations of the two ends of an elongated space station main body shell for allowing quick and easy coupling to another main body end termination or to other matching termination from spacecraft, and to have these end terminations serve a dual purpose of encapsulating a flexible folded up main body of the space station within two end termination modules; and a method of using a circuitous hollow tube used to convey foam in a controlled way around the perimeter of an end termination opening through a path for conveyance of inhabitants and goods. This hoop tube is inside an end of the flexible main body wall where it distributes the foam evenly starting from the special terminations; the foam breaks a bond of adhesive between an inner flexible wall and an outer wall whose strength holds the two flexible walls together so securely that the vacuum of space cannot pull the walls apart due to their acting as a single thickness without any residual gas in the bond between the walls, only when the circuitous hoop tube reaches a pressure that exceeds the adhesive tenacity does the foam separate the walls therby eliminating surging of the foam into otherwise nonbonded walls and eliminating gas pockets by controlled formation of bubbles in the foam through restriction of advance of foam by bonding the walls to have calculated resistance to pressure needed to spread walls apart.

2. Prior Art

There is increased need to lessen on site manual labor to fabricate a habitat ready for on site deployment.

The typical devices do not have interconnect capability coupled with using the interconnect portion as shipping flanges to protect the flexible wall between them, nor do they incorporate with injecting foam a dispersal mechanism such as the proposed hoop tube, neither has it been considered to bond the two walls together so that only pressurized foam spread them apart. Other procedural objectives are use of rigid tanks, flexible hollow walls not bonded as a single thickness having foam injected between the walls and into a space preserved as a separate entity to be filled up with foam lending itself to trapping gas bubbles accompanied by surging of foam in a random unmoderated manner; no system to incorporate a primary use as shipping container, secondarily acting as a standardized interconnector between other stations or ships and hatch covers, tertiarily to evenly distribute foam into the double wall cavity while at the same time using the dispersal hoop tube to retain the main body to the standard interconnect.

The present invention substantially resolves those problems which exist in deploying flexible hollow wall space stations disclosed by prior art, along with rolled up expandable booms.

The space station consists of an adhesive bond between two flexible walls restrained from separating from each other beyond a calculated distance by straps attached one end to one wall and its opposite position on the other wall, these strap lengths are in correspondence with the thickness of foam desired between the walls, ancillary methodology incorporates the protective shipping flanges alternative secondary use as a standardized interconnector to other modules, hatches; subsequently usage of shipping interconnect utilized to retain flexible wall upon itself by virtue of dispersal hoop tube extending within the and communicating to the adhesive bond between the double wall flexible main body.

SUMMARY OF THE INVENTION

The present invention comprises a set of flange containers protecting the flexible double wall main body during shipping to the site having the folded main body completely encapsulated by the set of two halves, the joined halves now having two ends terminate in the form of flanges with a hole at its center to communicate to the interior of the main body; alternatively the shipping flanges act as a standard interconnect by virtue of flange lip protrusion radially creating a lip edge on internal or external diameter of the opposing ends of the container, this lip edge can be simply clamped to another identical diameter lip edge. Within the flange is a circuitous hollow tube with perforations all around its circuitous route facing the opposing flange, and attached at the side facing the flange are tubes that run into the flange thereby communicating with reservoirs of the plastic and gas catalizer to the diameter of the circuitous hollow tube permitting the mixture now foam to cross from flange to hoop tube. This extension of the hoop tube is encapsulated within the flexible double wall binding adhesive thereby acting as an anchor retaining the open end through hole into the interior of the main body onto the standard interconnect shipping flange. Prior to assembly of the flexible inner and outer walls into a monolithic single thickness by compression of the walls together the side of each wall facing the other is sprayed with an adhesive flexible in nature and having a bond strength to impede breakdown of the bond to withstand the vacuum of space from pulling them apart, coming apart only under the additional impetus of the foam pressure forcing its way breaking the bond of the adhesive in a controlled way without surging beyond a point at which the bond is not broken down and the two walls remain bonded together as a singular monolithic single thickness that is molecularily homogeneous in terms relative to the catalyzing effect of the adhesive sprayed on the walls, this adhesive having a majority of constituents making the adhesive the same as the flexible plastic walls composition but has added to it a solvent creating a plastic adhesive liquid to spray upon the walls, and upon its curing bonds the two flexible solid walls together so that the molecules of the wall and the adhesive are predominantly the same or monolithic one thickness flexible wall having a fracture plane for seperation of the walls by the foam pressure peeling the bonded walls apart down the plane of least resistance; the implication is the adhesive and flexible plastic wall are composed of the same molecule with a solvent to catalyze the flexible surface thereby etching its surface to molecularily combine the two wall surfaces to each other. A cowl to retain the flexible wall having an opening around its perimeter facing its opposing shipping flange acts as a dispenser moderator of the flexible wall folded behind the cowl retaining the bulk of the body; the body has an end that extends through the cowl perimeter opening to terminate attached to the opposing shipping flange hollow hoop tube, as the foam is pressurized into the adhesive fracture zone it fills the wall and the increase in size of the wall pulls the main body out of the cowls perimeter opening, filling only the wall area on the outside of the cowl due to constriction of the cowl opening.

It is therefore an object of the present invention to provide an improved method of utilizing the deployment container as a standardized connector flange.

It is another object to utilize the body of subsequent standard connector flange body to have the flexible bonded double wall attached to the inside of the flange body by anchoring it to the hollow circuitous hoop tube perforated along its diameter to communicate foam from the reservoir out those perforations that directly communicate to the adhesive fracture plane.

DESCRIPTION OF THE DRAWINGS

FIG. (1) is a perspective side view of the present invention in the fully deployed state.

FIG. (2) is a crossection view of the deployment container showing standard connector flange lip lock, shipping flange shield, folded flexible wall, dispensing cowl perimeter opening, hollow perforated hoop tube, reservoir tanks for multiple part catalyst, regulators to inject foam.

FIG. (3) is a cutaway view of the shipping flange exposing the hollow perforated hoop tube and the path the foam enters from reservoir transfer tubes to the hoop tube and out the perforations that break the bond of adhesive between the inner and outer walls.

SPECIFICATION PREFERRED EMBODIMENT

Figure 1:
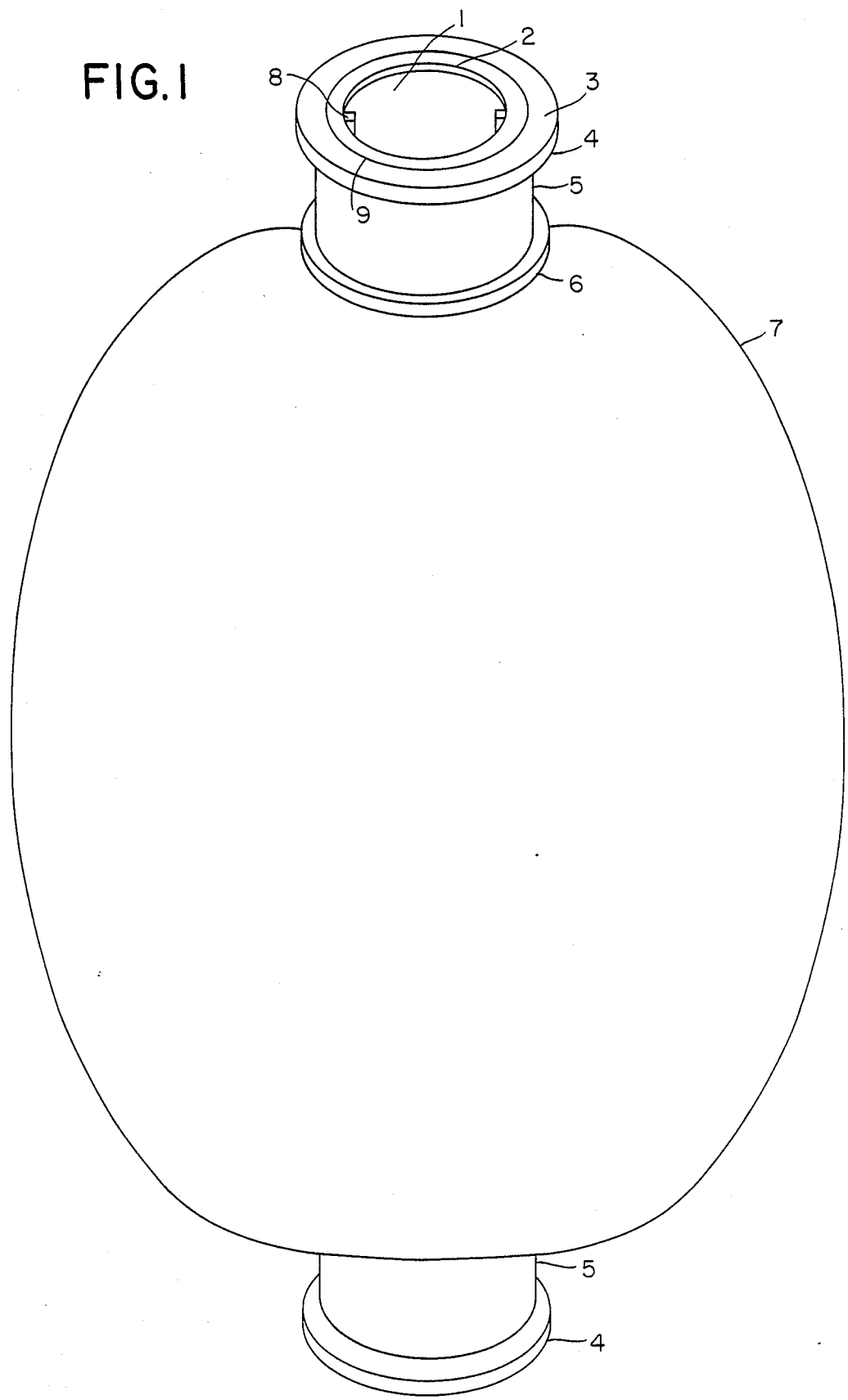

An understanding of the present invention can best be gained by reference to FIG. 1 wherein a perspective view of the present invention and improvements of a space station are generally designated by the reference numeral 5. As stated previously, the present capsule will allow easy and rapid erection. In this context, the end flanges are used during shipping to encapsulate the flexible double wall envelopes, and standard connector flanges in accessible attitude are integral. Within the the seperated flanges are circuitous hoop tubes to hold the double wall against the end flanges, the hollow hoop tube alternately is utilized as a communication passage for the pressurized foam catalyst to enter the hollow wall space temporarily adhesively bonding the inner surfaces of the double wall balloons together, this temporary bond between the walls prevents surging of the foam beyond the point of the volume area in which the temporary adhesive has not broken down by the predetermined pressurization of the foam necessary to spread the flexible walls apart.

FIG. 1 shows prefabricating deployment modules numerals 5 at opposing ends of flexible main body singular thickness wall 7 constituting the bulk of the invention; numeral 1 indicates the through hole passage from the exterior through the deployment cylinder 5, extending axially the end flange 2 overlaps into the through passage around its perimeter, and extending beyond the diameter of module 5 is flange extension lip 4 and 6, 8 is latch connector, numeral 3 represents the circular mating surface at each deployment cylinders end, numeral 9 represents a circular O-ring for a vacuum seal.

Figure 2:
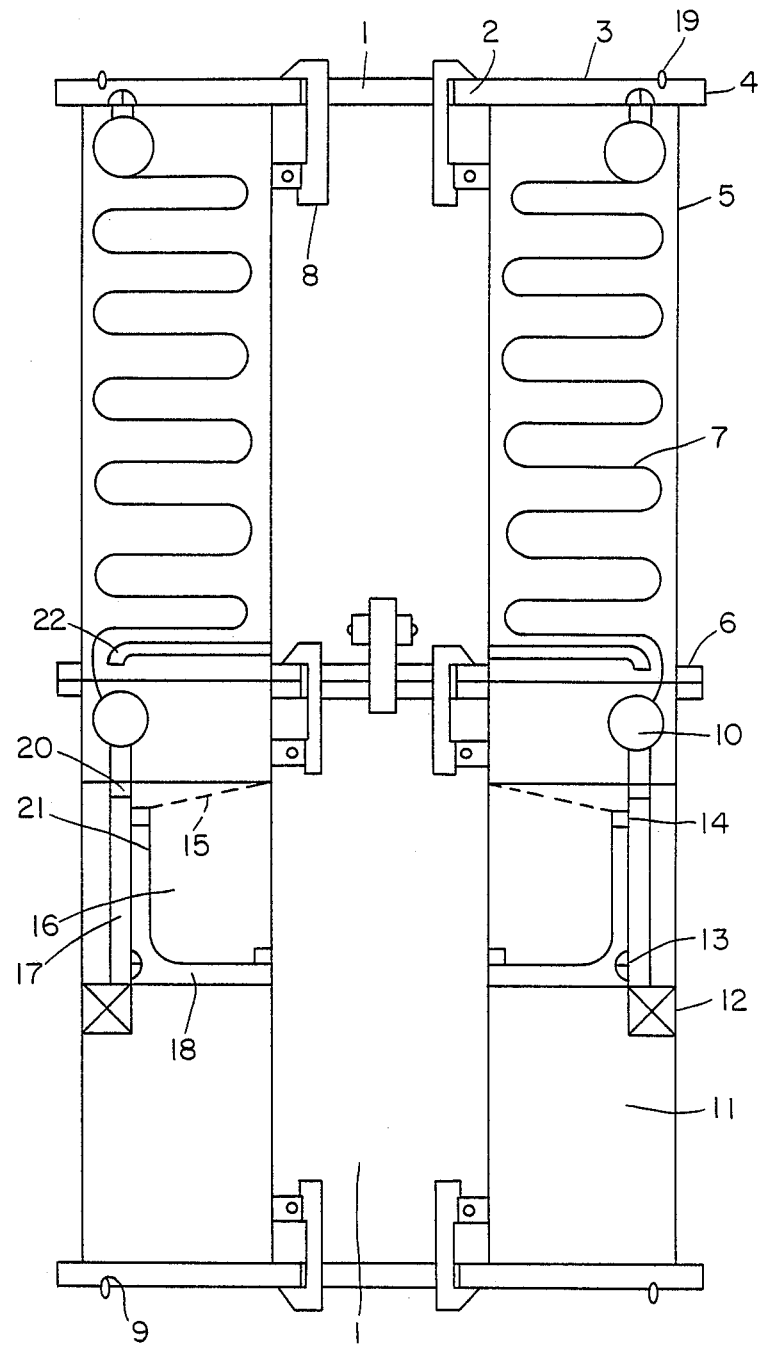

FIG. 2 shows the deployment container sectioned into a half cylinder down the axis where numeral 1 shows the through hole passage down the entire center of the cylinder, numerals 2 are internally radiating flange lips; 4 around the perimeter of the opening and opposing them are the externally radiating flange lips beyond the perimeter of the deployment external shield cylinder 5, housing flexible wall 7, bleeding valve moderating pressure in tube 10, the numeral 3 is the circular flat cylinder end standard mating connector surface with a depression on its diameter for an O-ring 19; numeral 8 shows a hinging pawl latch, numeral 10 shows hollow and perforated hoop tubes internal diameter, numeral 11 shows circular pressurized liquid oxygen nitrogen and carbondioxide for injection through regulator 12 into passage tube 17 communicating to a bleeding port 13 to fill plenum area 18 and also communicates pressurized gas to hollow hoop tube 10; plenum area when pressurized depresses flexible container 21 attached to walls by compression rings 14, plastic 16 is injected into aerating valve 20 from pressurized tank 11, 15 is a wire mesh inhibiting the flexible bag of liquid plastic from clogging the valve 20. Numeral 22 shows the flexible wall retainer cowl lip for dispensing flexible folded wall.

Figure 3:
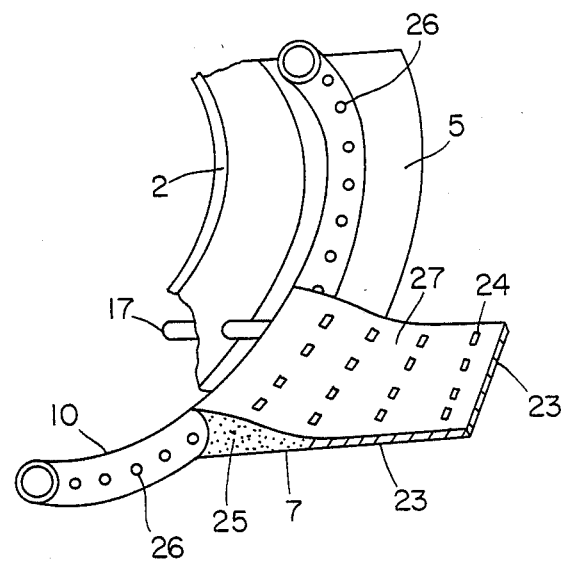

FIG. 3 shows a cutaway section of the circuitous hoop tube 10 held onto the flange 2 by inlet 17, and the double wall retained onto the flange 2 through wrapping the double wall 7 and 27 around the circuitous hoop tube 10. Perforations 26 around the entire diameter of tube 10 convey foam into the adhesive bond intersection 9 between the walls 7 and 22. Numeral 24 indicates numerous point connections of straps, and pressurized foam 25 breaks bonding adhesive 23.

It should be understood that the invention is not limited to the particular embodiment shown and described herein but that various changes and modifications may be made without departing from the spirit or scope of this concept as defined by the following claims.

What is claimed is:

1. A prefabricated space station comprising first and second members connected by a plurality of latches, a cylindrically formed folded flexible double walled body located within said first member and having an exposed annular edge extending into said second member, means within said second member upon actuation for dispensing foam evenly into the annular edge of said flexible body for causing the two walls of said body to spread apart thereby causing said body to expand and permit the deployment of said body fully expanded.

2. The space station of claim 1 in which said dispensing means consists of a hoop tube connected to said edge of said body, the wall at said edge being separated to form separate edges to overlap said tube, said tube having openings facing into said wall for directing flow of foam evenly between said separate edges, the two walls of said body being bonded by an adhesive to prevent surging of foam within the walls of said body and prevent the formation of bubbles from premature separation of the walls which could have been caused by the vacuum of space were it not for the counteraction of the adhesive holding the walls together until foam pressure allows the walls to separate.

3. The space station of claim 2 in which said second member contains a tank pressurized with liquid to be employed in producing said foam, and annularly shaped means within said first member adjacent the exposed annular edge of said body for dispensing the walls of said body out of said first member as said foam separates said walls to form upon full deployment said space station with said first member attached to one side of said state and said second member attached to the other side of said space station.

* * * * *